June 19, 1934.     W. M. FELLERS ET AL     1,963,081
AIRPLANE CATAPULT
Filed Nov. 6, 1931      8 Sheets-Sheet 6
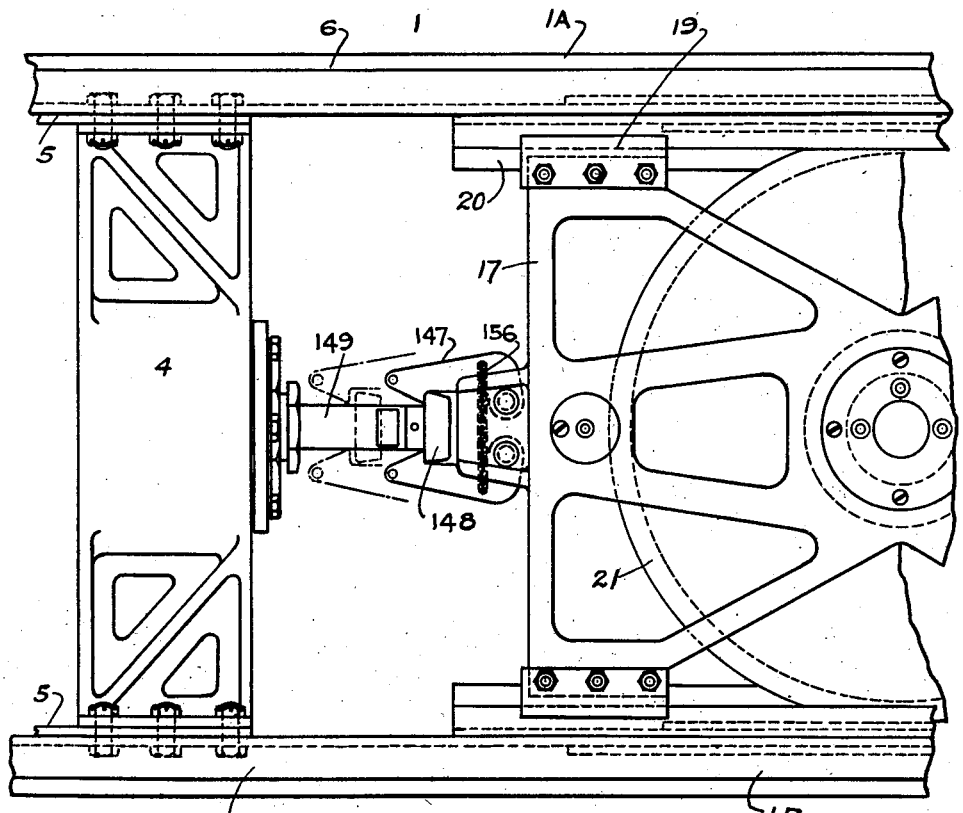
Fig. VI.
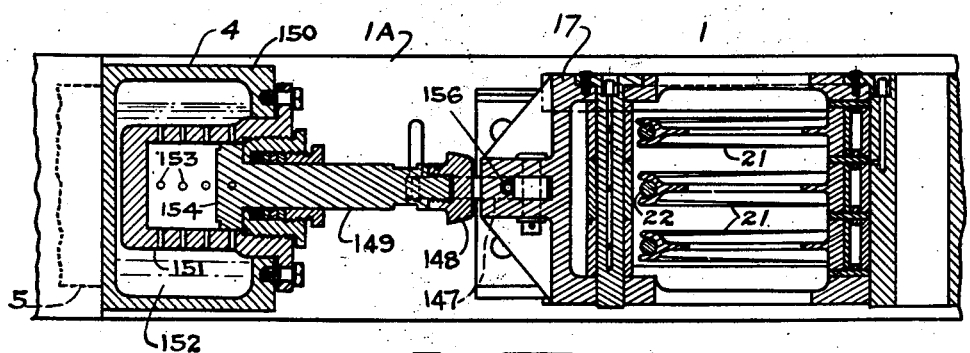
Fig. VII.
Inventors.
William M. Fellers
and Frederick B. Gross
By Robert A. Lowunder
Attorney.

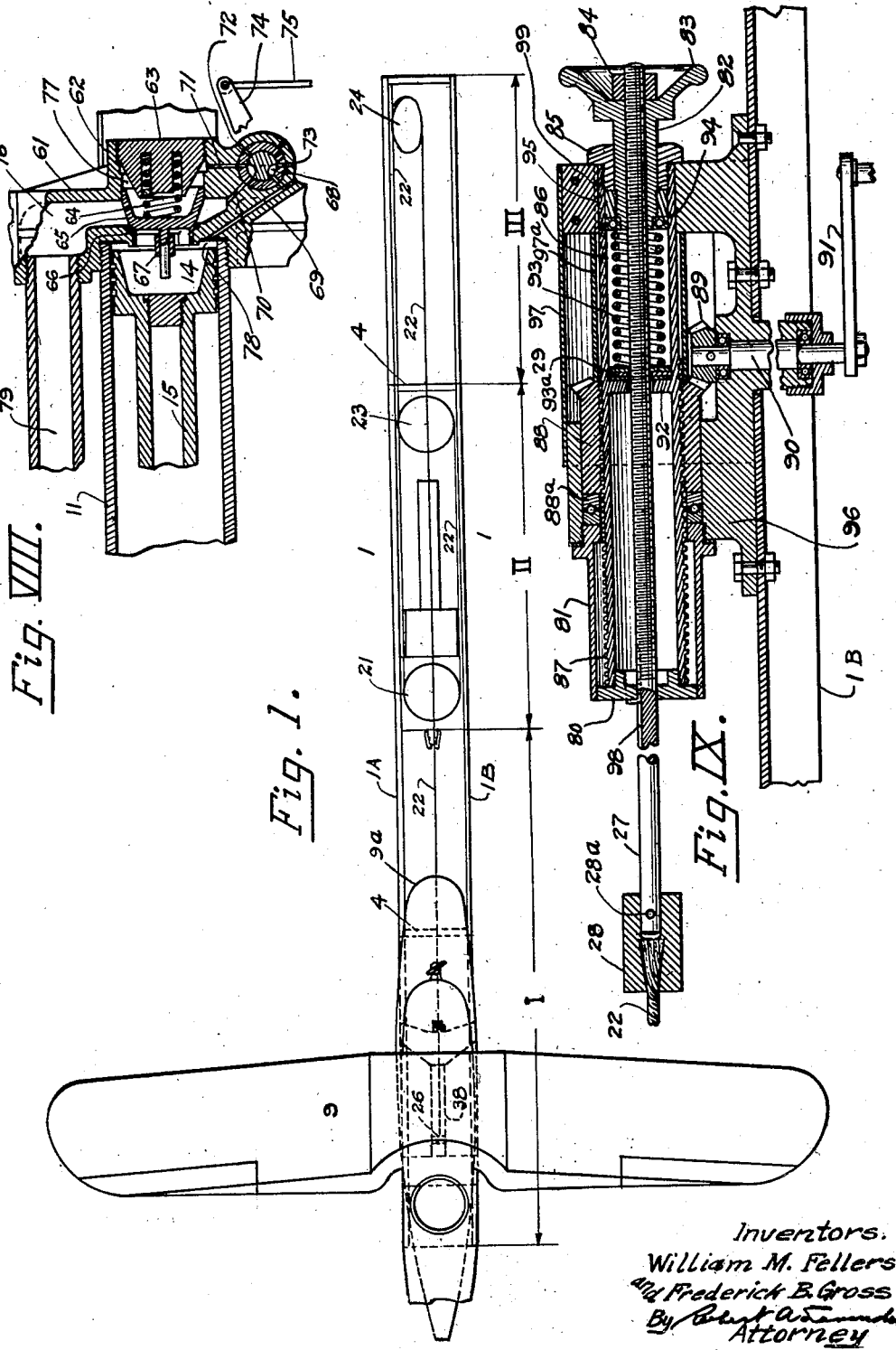

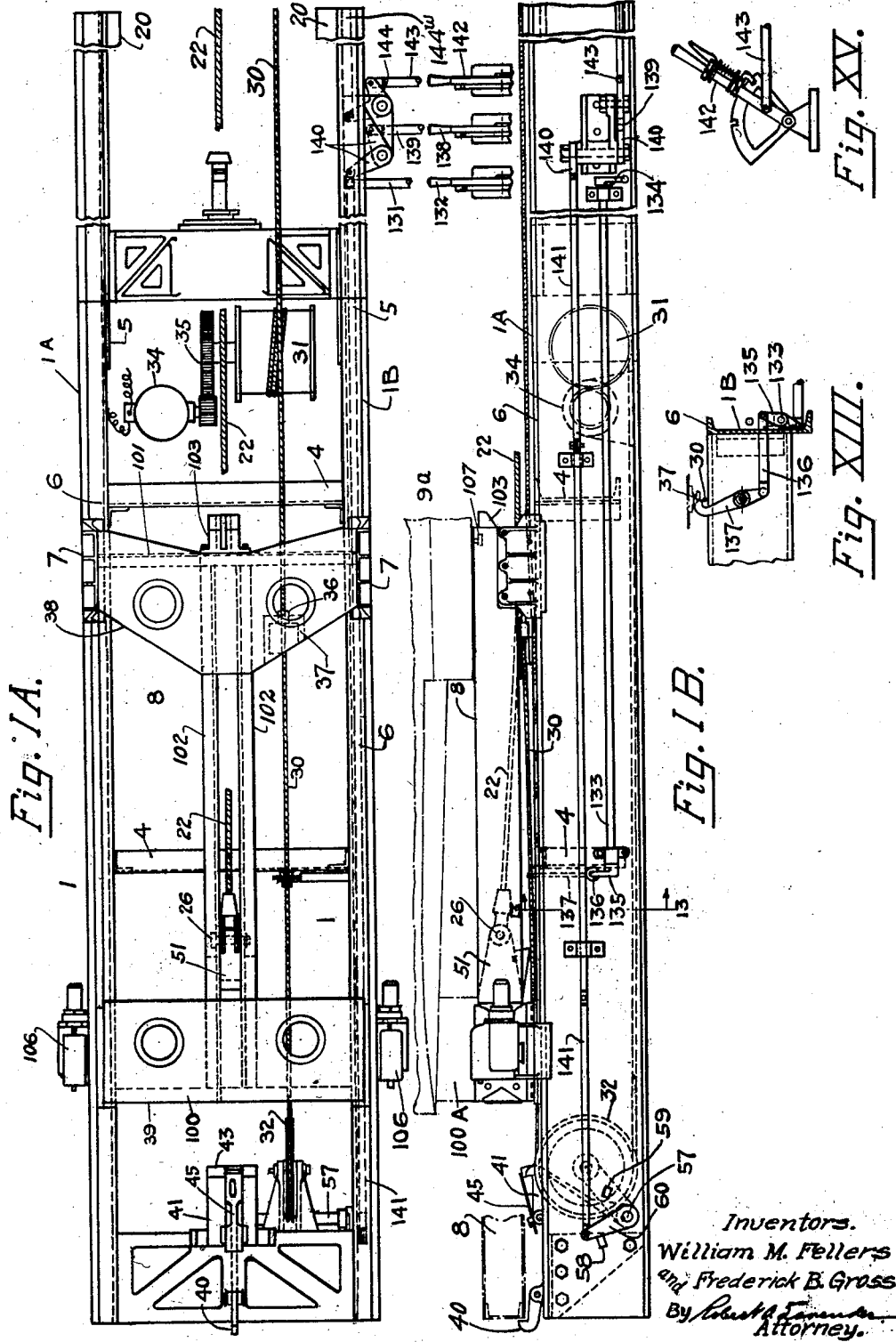

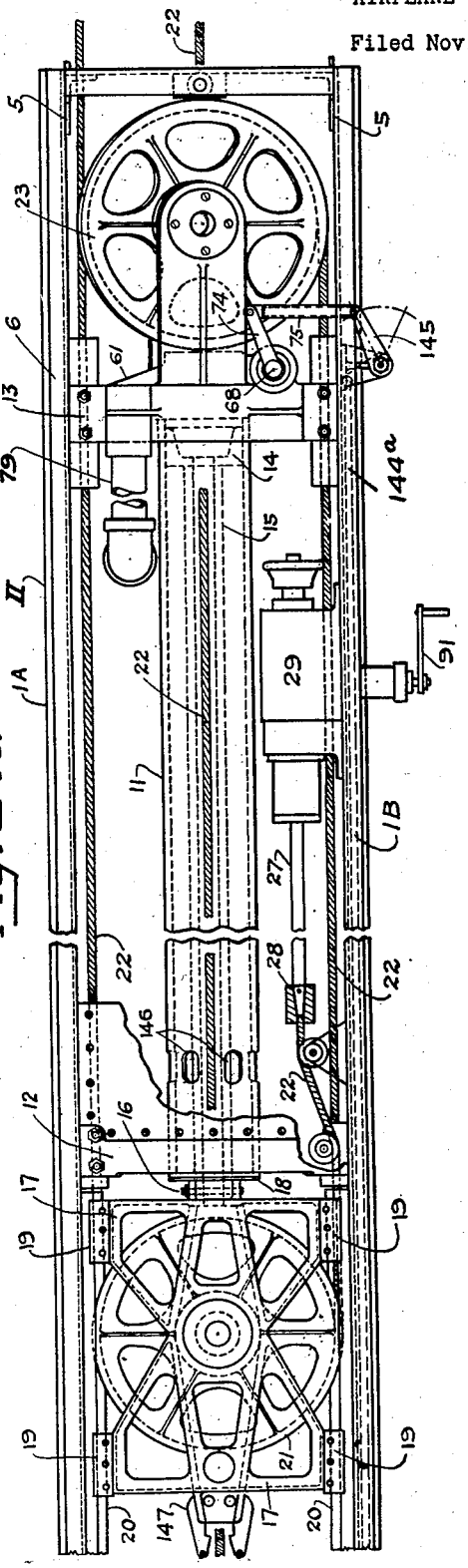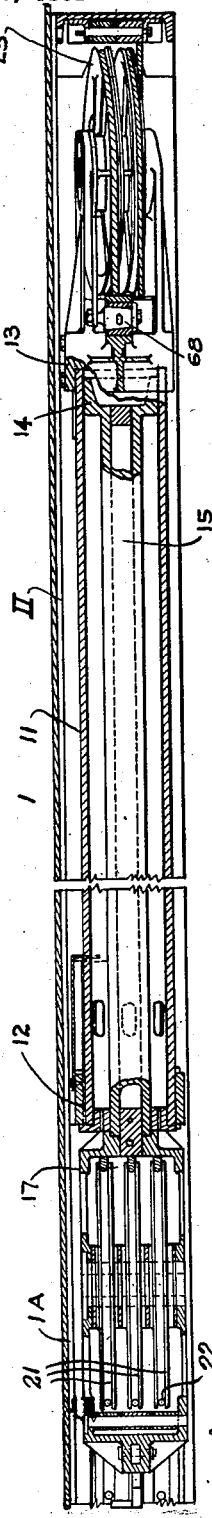

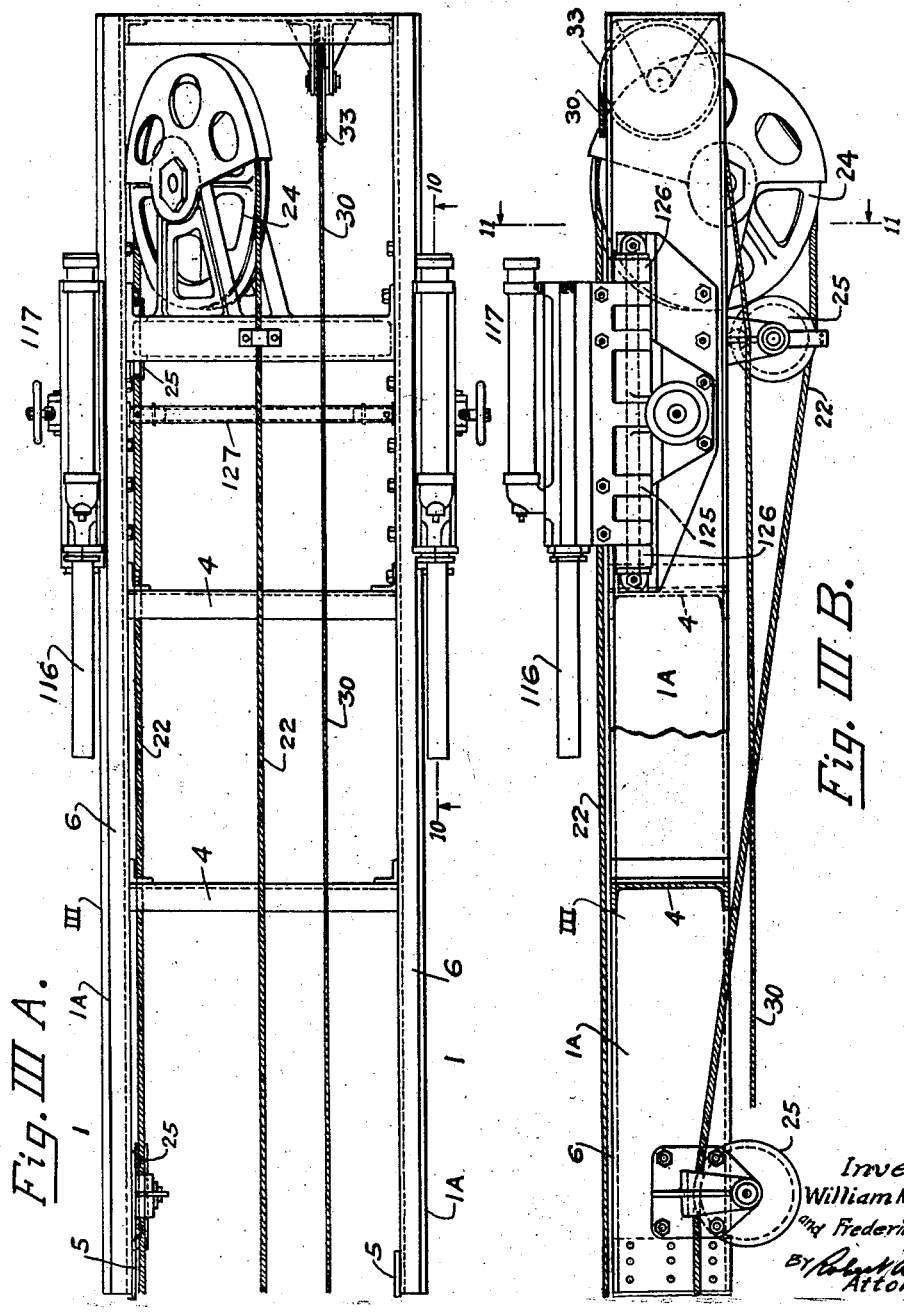

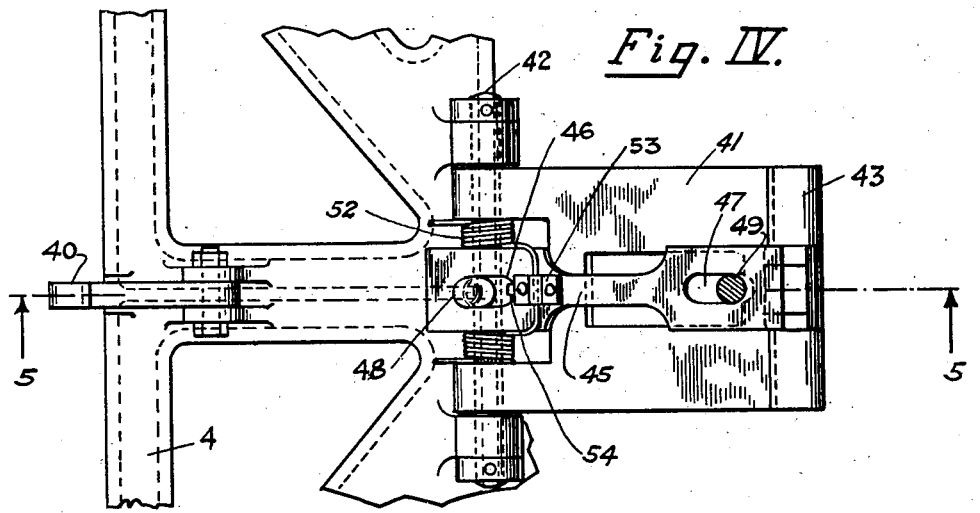
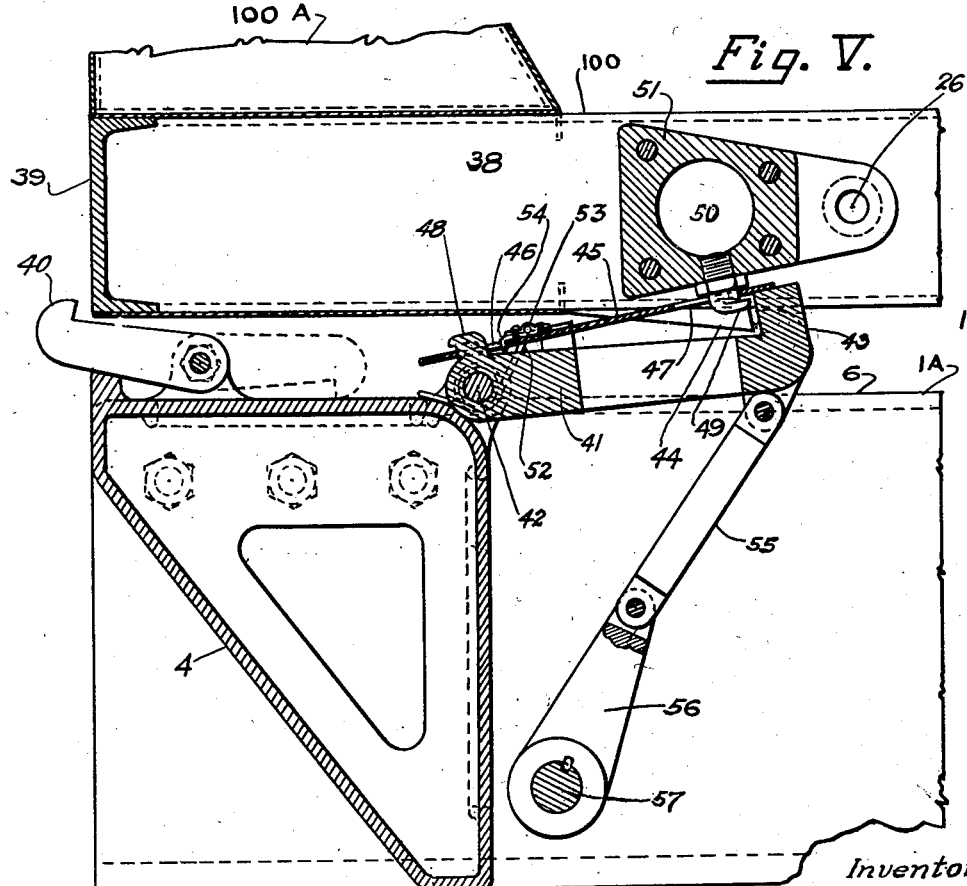

June 19, 1934.    W. M. FELLERS ET AL    1,963,081
AIRPLANE CATAPULT
Filed Nov. 6, 1931    8 Sheets-Sheet 7
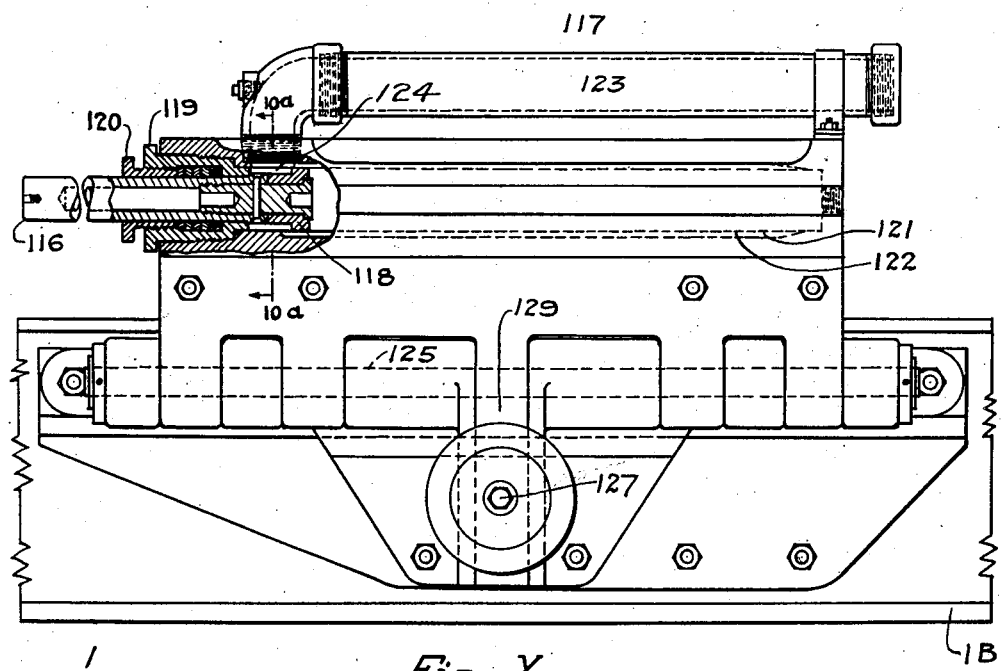
Fig. X.
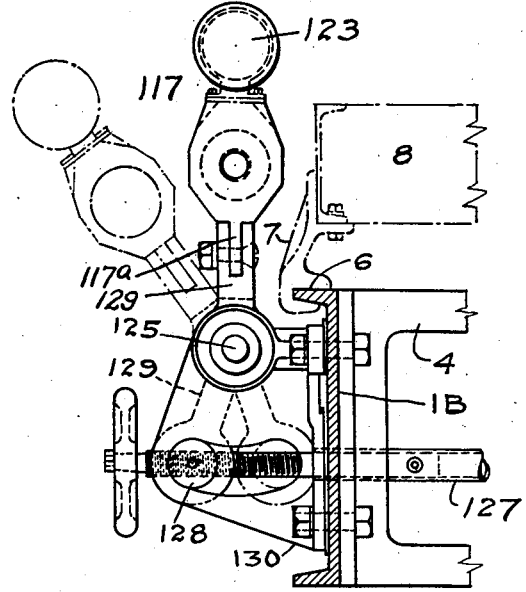
Fig. XI.
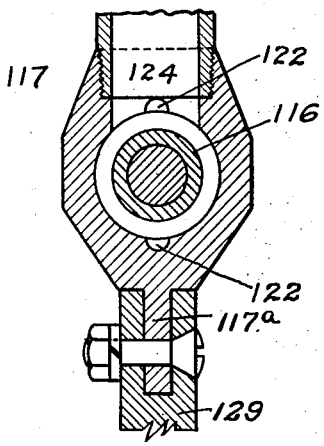
Fig. Xa.
Inventors,
William M. Fellers
and Frederick B. Gross
By Robert A. Lavender
Attorney.

June 19, 1934.   W. M. FELLERS ET AL   1,963,081
AIRPLANE CATAPULT
Filed Nov. 6, 1931    8 Sheets-Sheet 8
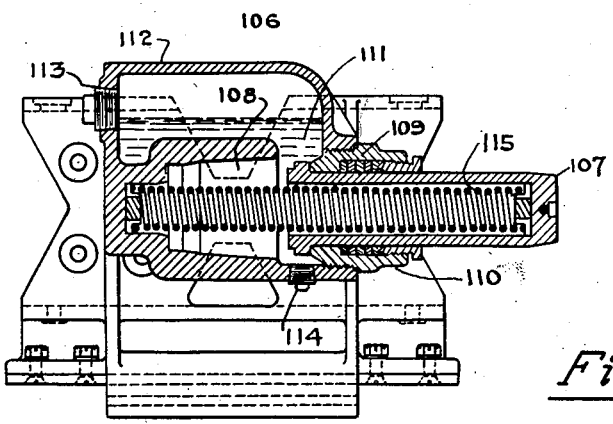
*Fig. XIV.*
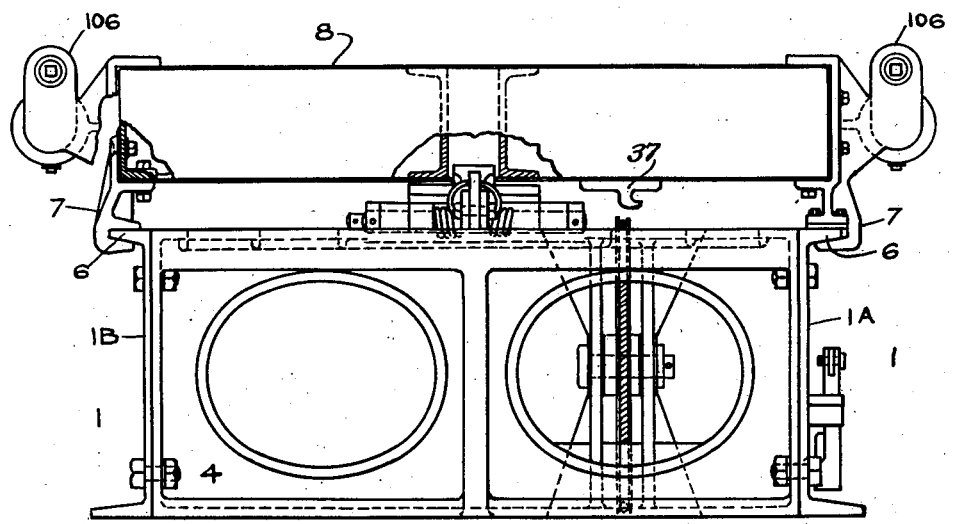
*Fig. XII.*
Inventors.
William M. Fellers
and Frederick B. Gross
By Robert A. [Levenson]
Attorney.

Patented June 19, 1934

1,963,081

UNITED STATES PATENT OFFICE 1,963,081

AIRPLANE CATAPULT

William M. Fellers, United States Navy, and Frederick B. Gross, McLean, Va.

Application November 6, 1931, Serial No. 573,430

24 Claims. (Cl. 244—2)

(Granted under the act of March 3, 1883, as amended April 30, 1928; 370 O. G. 757)

This invention relates to catapults and particularly to that type of catapult adapted for use in launching airplanes from barges, ships, limited land areas or like restricted spaces, or in launching other types of vehicles or projectiles.

Specifically, the invention relates to the class of catapults wherein the expansive force of a compressed fluid, such as air, is utilized in launching the airplane or other device to be launched.

A principal object of the invention is to provide a pressure controlling mechanism constructed and arranged in a novel manner calculated to produce a more efficient application of power to the propelling units and at the same time functioning to conserve the power supply.

Another object is to provide novel mounting means for the power unit, insuring greater stability, compactness, and accessibility.

A further object of the invention is to provide novel tensioning and tension measuring means for taking up the slack in the power transmitting cables connecting the power unit to the launching car.

Another object is to provide a novel combination of restraining and safety devices for holding and locking the launching car prior to the launching action.

Still another object is to provide a novel combination and construction of shock absorbing and retarding devices for minimizing shock and eliminating rebound in the operation of the catapult.

Other features and advantages to be derived from the use of the invention herein disclosed are to be found in the specific construction, arrangement, and inter-relation of the parts, as will be evidenced from an inspection of the following specification, when read with reference to the accompanying drawings illustrating what we now consider to be the best mode of applying the invention in a practical structure of the character to which the invention relates.

In the said drawings, Figure I is a diagrammatic plan view of a catapult with an airplane mounted thereon in "battery" position.

In order to show the assembly of Figure I, on a larger scale, we have divided the assembly into three parts designated I, II, and III, respectively, part I being shown in Figure IA, part II being shown in Figure IIA, and part III in Figure IIIA.

Figure IB is a view in elevation with parts broken away, of the part shown in plan in Figure IA.

Figure IIB is a view in elevation, with parts broken away and some sectioned, of the part shown in plan in Figure IIA.

Figure IIIB is a view in elevation with parts broken away, of the section shown in plan in Figure IIIA.

Figure IV is an enlarged detail view of the rear end of the catapult, showing the hold back, release and safety lock devices.

Figure V is a sectional view along the line 5—5 of Figure IV, with a portion of the car shown in relation thereto.

Figure VI is a detail view showing the decelerating mechanism.

Figure VII is a central longitudinal section of the same with parts omitted for the sake of clarity.

Figure VIII is an enlarged section through the control valve of the catapult engine.

Figure IX is a central vertical section through the tension adjusting device for taking up the slack of the power transmitting cable.

Figure X is a central vertical section through the buffer on the catapult along the line 10—10 in Figure IIIA.

Figure Xa is an enlarged fragmentary view along line 10a—10a of Figure X.

Figure XI is a transverse section through the same along line 11—11 of Figure IIIB.

Figure XII is an end view of the car showing the car buffer and cable retaining member, with parts of catapult beam in section.

Figure XIII is a detail view of the retracting cable disengaging apparatus along the line 13—13 in Figure IB.

Figure XIV is a central vertical section through one of the launching car buffers taken on line 14—14 of Figure XII.

Figure XV is a detail view of one of the master control levers.

Referring to the drawings, reference numeral 1, designates the bed or framework of a catapult comprising a pair of side members 1A and 1B preferably channel sections, joined at the ends by suitably spaced intermediate braces 4. The bed or framework is made continuous by joining the successive channel sections with suitable plates 5 forming butt joints. The upper flange 6 of each side member 1A and 1B is machined to constitute a guiding rail or track for the shoes 7 of the launching car 38 which serves as the carriage for the airplane to be launched. The airplane 9 is shown provided with the usual centrally located float or landing structure 9a, this structure being intended to represent whatever type of landing gear is employed on the airplane.

The car 38 is propelled by being connected to the engine of the catapult, the engine being preferably of the compressed air driven piston type.

A feature of the invention in this connection is the means for mounting the engine entirely within the vertical projection of the catapult bed. This is an improvement over former practices of mounting the engine, and has the advantage of concentrating the mechanism within a much smaller space with a resulting increase in efficiency and ease of maintenance. The engine consists of a cylinder 11 mounted on cross-plates 12 and 13 rigidly secured to the bed of the catapult, the cylinder containing a piston 14 and piston rod 15. Figs. IIA, IIB. The piston rod 15 is secured at its outer end, by a suitable pin 16, to the cross-head 17, a conventional stuffing box 18 being provided at the end of cylinder 11 through which said rod 15 passes.

The cross-head 17 is provided with slide shoes 19 adapted to engage the guide rails 20 secured to the inner faces of the side members 1A and 1B. Also carried by the cross-head 17 is a group of sheaves 21 adapted to receive the cable 22. This cable secured at one end at 29, thence extends over a sheave 21, thence forward over a speed multiplying sheave 23, then makes several turns around other sheaves 21 and 23 and finally passes forward to the idler sheave 24 at the forward end of the catapult. From this point the cable returns to the launching car 38 by way of guide sheaves 25 suitably located as shown in Fig. IIIB. The point of attachment to the launching car 38 is shown at 26, the other end of the cable being secured to the rod 27 as indicated at 28A. This rod 27 forms a part of the combined tension adjusting and slack take-up device 29, to be described in detail hereinafter.

The airplane, having been hoisted into position, its float 9a is attached to the launching car in a suitable way to be described later. In order to bring the car back to battery position after a launching there is provided a retracting cable 30 which is secured at both ends to and extends about a power driven drum 31, Figs. IA, IB, and passes over guide sheaves 32 and 33 at opposite ends of the catapult. The drum 31 is mounted in bearings secured to the bed and is adapted to be rotated by a suitable prime mover 34 through speed reducing mechanism or gearing 35. A stop member 36, Fig. IA, is also provided, this stop member being made fast to the cable 30 and positioned so as to engage a clutch slot in a grip member 37 Fig. XII, mounted on the under side of the car structure 38 when the cable has been moved sufficiently by energization of the motor 34. Continued movement of the cable 30, after engagement with clutch 37, will bring the car back to battery position, whereupon cable 30 may be removed from said grip 36.

On reaching battery position the rear end 39 of the car 38 is adjacent to and adapted to be stopped from further backward movement by a stop 40, when in the position shown in full lines in Figure V. At this point a combined hold-back and safety locking mechanism is brought into play to secure the car 38 in this battery position. This consists of a latch member 41 pivoted to the frame structure of the catapult at 42, and having at its other end a lip 43 adapted to engage a lug 44 secured to the under surface of the car 38. Before the car 38 is brought into this position, however, a breaking bar 45 is placed upon the latch 41. This bar is provided with elongated apertures 46 and 47, the former being engaged by the hooked lug 48 on and extending upwardly from the pivot point of the latch 41 and the latter being located so as to engage depending hooked lug 49 secured as at 50 to the forging 51 integral with the car structure 38. Bar 45 is of definite strength adapted to hold the car 38 rigid until all the slack has been taken up in the launching cables and other parts and the launching pressure has been built up sufficient to break bar 45 and thereby release car 38 to launch the plane. The angular position of bar 45 tends to initially hold the car 38 more firmly on its track at and just before the instant of breaking, thus imparting initial lateral stability to the plane in its launching movement. In order to prevent lateral motion of the bar 45 a clip 53 is provided, this clip being held in position by spring 52, and having a finger 54 engaging the slot 46. With this construction it is apparent that the breakable bar 45, is held by spring 52 and its clip 53 at its rear end over lug 48 with its forward end resting on the top of lip 43 of latch 41. While so held the forward end of the bar 45 may be conveniently raised, with its aperture 47 encircling the hooked lug 49, by the upward movement of the latch 41 into the double locking position shown in Fig. V when the car 38 is in its battery position therein shown. Associated with the latch 41 are the toggle links 55 and 56, pivoted at one end to the latch 41 and secured at the other end to a shaft 57. The movement of the links 55, 56, is limited by stops 58 and 59 properly positioned, the movement being effected by crank arm 60, shown in Figure IB. With car 38 in locked position as shown in Figure V, the links 55 and 56 are in locking disalignment as shown, and therefore they act to prevent any accidental or premature shifting of the latch member 41, either by application of pressure in the firing cylinder or by any other application of force other than direct actuation of the crank arm 60.

The means for controlling the application of the compressed air to the power cylinder 11 comprise the provision of a valve mechanism constructed and disposed in a novel manner so as to provide greater compactness and simplicity, the whole structure being located within the side members 1A and 1B.

As shown in Figure IIA and VIII the valve structure is mounted in the cylinder head 61, said head being provided with a boss 62 having a plug member 63 bored to receive a spring 64. This spring serves to hold the piston valve 65 against its seat 66 in the absence of air pressure, the valve 65 being held centrally disposed by a suitable means 67. A rotary plug valve 68 is also provided in the cylinder head 61, this valve having suitable ports adapted to register alternately with the passages 69, 70, 71, 72, and 73, in response to movement of the valve lever 74, actuated by the rod 75.

An important advantage resulting from the construction just described is the fact that no leakage of air under pressure can result in building up pressure in the cylinder or valve chambers. This is due to the fact that the valves are so proportioned and the passages are so arranged that a condition of equilibrium is maintained automatically, thereby resulting in equal pressure on both sides of the mechanism.

In the position shown in Figure VIII, the air passages 70 and 71 are in communication through the ports in plug valve 68 with the air pressure supply, thereby causing equal pressure in chambers 76 and 77, and also permitting an escape to the atmosphere (through passages 69 and 73) of any air which may leak to piston 14 past the seat 66. This is the battery or non-firing position. When the valve is turned to firing position the air in chamber 77 is allowed to escape through passages 71 and 72 to the atmosphere, at the same time communication between passages 69 and 73 is cut off. This opening of passage 69 to the atmosphere quickly creates an unbalanced pressure condition which speedily forces valve 65 from its seat, the opposition of spring 64 being negligible in comparison with the high pressure exerted against the outer surface of the piston valve 65 by the compressed air in chamber 76. This compressed air, supplied from source 79, rushes past the seat 66 of valve 65 and into the chamber 78 of cylinder 11 to drive piston 14 outward and thereby project the launching car. At the same time the closing of passage 69 prevents any objectionable leakage of compressed air to the atmosphere during the launching operation.

The tension adjusting and take-up device is shown in detail in Figure IX, and comprises a threaded rod 27 attached to the cable block 28 at one end by a pin 28a and passing through the head 80 movable within the housing 81, then through said housing and into the elongated nut 82 which terminates in hand-wheel 83, a lock nut 84 being provided to prevent the wheel-nut 82, 83 from varying from a set position and being backed off the rod 27. The nut 82 has a cylindrical outer portion which is revolvably and longitudinally journaled in bearing 85 which is in turn threaded in to the forward end of tube 86. The flange on bearing 85 extends over the end of tube 86 and against a portion of base 96 to limit the movement of tube 86. This tube 86 is externally threaded on its rearward end for a considerable distance as shown at 87, so as to be propelled along with rod 27 in response to rotation of the internally threaded gear 88 meshing with the bevel pinion 89 keyed on shaft 90 provided with bearings in base 96. Shaft 90 is provided at its outer end, which extends beyond the bed, with a hand crank 91. The tube 86 is provided with a dividing wall 92 having an aperture permitting free passage of the rod 27 therethrough, this wall forming a stop for one end of the compression spring 93 which extends from the said wall to the ball or other thrust bearing 94 interposed between it and the remaining end of spring 93. Bearing member 94 is adjacent the bearing 85 and collar 95 is secured by threads or otherwise to nut 82. The housing 81 is threadedly secured at one end to base 96 which in turn is bolted or otherwise suitably fastened to the frame 1B of the catapult. A shield 97 is preferably provided to encase the gears 88, 89 and to protect the unit. The toothed side of gear 88 bears against a tube 97a which surrounds a portion of tube 86 and bears at its opposite end against a convenient portion of base 96. The opposite side of gear 88 is provided with a suitable thrust bearing 88a which is held in position by the end of tube 81 which is threaded into a portion of base 96.

After the car, with airplane attached thereto, has been placed in the battery position shown in Figure V, the permanent stretch or set in cable 22 (if any) is taken out by turning hand-wheel 83. This causes the threaded rod 27 to advance in head 80 and is kept from turning by its keyway 98 engaged by a key on head 80. The cable 22 thereby becomes sufficiently taut to successfully resist further effort to advance the rod 27 by turning hand-wheel 83.

The predetermined degree of tension is now applied to spring 93 by rotating hand-crank 91. This causes a forward movement of the tube 86 through the intermediary of the gears 88 and 89, the former being threaded internally to engage the corresponding threads on tube 86. This forward movement of barrel 86 causes a like forward movement of the member 85, as well as exerting a compressing action upon spring 93. When the bearing 85 has been moved sufficiently to contact with the adjacent shoulder of wheel 83, the operator accepts this occurrence as indicating that the spring 93 has been compressed the predetermined amount necessary to take the slack out of and produce the predetermined tension in cable 22 and and rod 27, and he thereupon discontinues rotation of crank 91 which remains in such position due to the fineness of the threads at 87. A key is provided to engage keyway 98 in rod 27, to prevent rotary displacement of the rod but to permit free longitudinal movement thereof. Likewise a key is provided to engage keyway 99 to prevent rotary displacement of member 86. The spring 93 is made of the requisite length and strength. When the same becomes set in use one or more washers 93a may be inserted at an end of said spring to afford ample longitudinal movement of nut-wheel 82, 83 relative to bearing 85.

The car 8, Fig. IA, is preferably composed of a pair of transversely disposed built-up sections 100 and 101 supporting centrally located channel members 102 spaced apart by a block 51 serving as the means for anchoring the power transmitting cable 22. At the forward end of the members 102 is provided a casting 103 for the purpose of holding down the forward end of the float or other landing gear by engagement with a bolt or stud 107 Fig. IB, on the float. This casting also acts as a force transmitting connection between the car and the float. Mounted on the rear section 100 is a specially designed cradle 100A, Fig. V, having its upper surface trough shaped to correspond to the contour of the bottom of the similar shaped portion of the float or landing gear. This cradle affords a rear support for such landing gear.

The four ends of the sections 100 and 101 are provided with the rail 6 engaging shoes 7 previously described. The rear shoes are preferably cast integral with the housing of the car buffers 106, one of which is shown in detail in Figure XIV. Referring to said figure it will be seen that each of these buffers comprises a contact plunger 107 adapted to be forced into an internally tapered receiving cup 108, a suitable bearing 109 and stuffing gland 110 being provided the former as a guide support, and the latter to insure liquid tightness. An opening 111 is provided in cup 108 to permit the displaced fluid to escape therethrough into the reservoir 112. Filling and draining plugs are provided at 113 and 114 respectively. For compactness of design the plunger 107 is bored to receive the compression spring 115 which acts to return the plunger to its outer position after absorption of the force of the impact between the plunger 107 and the rod 116 of the corresponding catapult buffer 117. These buffers 117 are located in registering alignment with the buffers 106, and in a position corresponding to the end of the catapult stroke. These buffers, one of which is shown in detail in Figure IIIB and Figure X, comprise a plunger rod 116 having an inner piston head 118, the rod being longitudinally movable in bearing 119, and the rod 116 being protected against leakage of cushioning liquid by the provision of a packing gland and nut 120. The head 118 is adapted to be forced along the bore of cylinder 121, formed with a series of machined longitudinal ducts 122, (shown best in Figure XA), permitting a limited rate of liquid flow past the head 118 and into the reservoir 123 by way of by-pass 124.

Attention is particularly directed to the manner of constructing these ducts 122. Heretofore interliners have been provided around the plunger, in which similar ducts or grooves were machined. The result of which was that upon movement of the plunger at the extremely high speed, which prevails in these devices, the resulting suction behind the plunger would cause the collapse of and the formation of blisters or bulges on the thin inner surface of the wall of the liner, thereby blocking return of the plunger and rendering the device thereafter inoperative until the liner is replaced. We have overcome this difficulty by machining the ducts in the bore of the cylinder proper, which is constructed with a much stronger wall section than could be possibly obtained with the use of liners.

In order to clear the path of the launching car to permit its withdrawal from the catapult bed, in the event a substitution of another car is desired, the buffers 117 are hingedly mounted on shafts 125 journaled in bearings 126 secured to side member 1A and 1B. Rotation of the buffers about the shaft 125 is effected by turning the threaded cross shaft 127. This longitudinally moves the internally threaded nuts 128, Fig. XI, and through them, the arms 129 connected to the buffers 117. The limit of the slot in frame 130 acts to maintain the buffers 117 normally in properly aligned relation to the car buffers 106.

With the type of buffer shown at 117 the plunger may be returned by hand or by admitting compressed air to act against the plunger head.

To enable the ready removal of the buffers 117 for replacement or repair, each of the buffer housings 117 are provided with a projection 117a, Figs. Xa and XI, which is removably secured by bolts 117b or otherwise to the upper portions of their arms 129, said projections extending longitudinally of their respective housings 117.

Having thus described in detail the parts entering into the preferred embodiment of the invention, the operation thereof will now be explained. Assuming that the airplane has been hoisted into position and its floats or other landing gear secured to the launching car 8 by means of the pin 107 which engages the slot in the member 103, with the rear portion of the float positioned upon the cradle 100A of the car, and the cable 30 placed in the notch of the cable grip 37, the motor 34 is energized to cause rotation of the drum 31.

Rotation of the drum advances the stop member 36 of cable 30 into engagement with the grip 37 and the continued movement of the cable then carries the car 8 along the trackway until the rear end 39 abuts against the stop 40 in the full line position shown best in Figure V. Upon reaching this position the spring 52, as previously described, holds the breakable bar 45 with its opening 46 hooked over the hook 48 and its opposite end on the top of the lip 43 with its opening 47 in position to be occupied by hook 49 when latch 41 is moved into its emergency locking position shown in Figure V.

The latch 41 being in its locking position the operator thereupon operates hand lever 132, connected by link 131 to crank 134 on lock-shaft 133 having bearings on the bed frame, Figs. IA, IB and XIII. Link 136 connects crank 135 to lever 137 fulcrumed on cross member 4 of the bed frame. The upper end of lever 137 is normally to one side of cable 30 and adjacent grip 37 when car 8 is in its battery position. Said operation causes lever 137 to move cable 30 out of the slot in grip 37. The cable 30 is thus freed from contact with the car 8, so that the subsequent movement of the car will not affect the cable. This also seats hook 49 firmly in its slot 47 in breakable bar 45.

The predetermined degree of tension is now placed upon the cable 22 and rod 27 by rotating hand-crank 91, as above explained in detail.

The operator's next action is to actuate the second hand-lever 138, Figs. IA, IB. This operates, through the intermediary link 139, bell-crank 140, link 141, crank 60 and shaft 57, to break the toggle joint formed by links 55 and 56 as shown more clearly on Figure V. This releases the safety lock 41, (which is adapted when in place to prevent the initiation of the launching movement, as well as the breaking of bar 45, even though the full launching force be applied to the car) withdraws the detent-lip 43, from the path of lug 44 and leaves the car 8 held only by the strength of the breaking bar 45. This bar is of sufficient strength to rigidly hold the car until a predetermined launching pressure is accumulated in the power cylinder to break the bar 45 and pull the car away on its launching journey.

The operator now manipulates the final lever 142 in its simple invariable movement. This operates through the link 143, bell-crank 144, connected to link 144a connecting bell-crank 145. Link 75 connects bell-crank 145 to crank 74 on valve 68. This operation opens the valve 68, Figs. IA, IIA, and XV, thereby admitting compressed air from the source of supply into the chamber 78, as above described. The power thus applied breaks the breakable link 45 and drives the piston 14 outward, thereby exerting a pull on cable 22 to propel the car 8 outwardly and effect a launching of the airplane.

Valve 68 is closed by the reverse movement of said parts at a time in the travel of car 8 determined by the operator's judgment to prevent wasting through exhaust passage 146 further air from source 79. As the car approaches the end of the catapult the buffers 106 and 117 engage, thereby bringing the car to a gradual stop, the airplane continuing on its journey and riding off the end of the catapult under the momentum imparted thereto, this momentum being sufficient with its own power to sustain the plane in flight.

The final portion of the stroke of the piston 14 is cushioned by reason of the trapping of air in the cylinder beyond the ports 146, some air having freely escaped through these ports prior to their being covered by the advancing piston. In addition to this cushioning action rebound and backlash of the power cables and other moving parts is prevented by the provision of the plurality of inwardly facing clutch-jaws 147, Figs. VI, VII carried on cross-head 17 on opposite sides of an intermediate anvil portion adapted to be impacted by head 148 of plunger 149. These jaws each have bevelled outer ends and locking shoulders to allow them to ride and hook over the correspondingly shaped head 148 of the plunger 149 forming part of the hydraulic buffer 130 supported by a cross member 4 of the bed frame. This buffer is of the double-acting type and each of its cylinder-cups 151 is provided through the wall with a series of by-pass ports 153 of gradually decreasing size on either side of the plunger head 154 to effect a uniform retarding action as the piston head 154 of plunger 149 is driven into the cups 151 by the force of the impact of jaws 147 with said anvil portion against the head 148. The jaws 147 are provided with a spring 156 which, with the location of the pivot points of jaws 147 no more separated than the diameter of head 148, acts to maintain the jaws in gripping relation about the rear surface of head 148 the instant they ride over the head.

From the foregoing it is apparent that we have produced an improved type of catapult having a safer, simpler, more compact, mistake-proof and more efficient and durable construction and arragement of parts, and one in which the operation is positive, reliable, free from objectionable effects, and liability to mistake and securely protected against hazard or improper functioning.

The provision of the various buffers 150, 117, 106, and the trapping of air in the cylinder 11 against piston 14 in advance of exhaust parts 146 ensures an efficient rapid rate of deceleration of the car 8 and other moving parts without the upsetting of the metal parts directly impacting against each other. The oil or air cushion between each impacting part and its support substantially contributes to the foregoing as well as substantially cushions and dampens the deceleration shock on the support of each impacting part.

The location of the buffers on opposite sides of and near the rear end of the launching car 8 with the corresponding location of the cooperating buffers on the launching end of the bed frame enables a shorter frame and launching track because the car runs between the frame end buffers; provides for the greater mass of the launching car being in advance of the car-buffer heads and thus affords a tension stress upon the car instead of a compression stress as heretofore; and enables the provision of a different rate of deceleration for each buffer and the attainment of an aggregate buffer deceleration at a greater rate with less shock and vibration than heretofore has been attainable.

The arrangement of the valve 65 in the head of the cylinder 11 with its port longitudinally in line with the bore of said cylinder, and the movement of valve 65 in said line away from said cylinder promotes simplicity of construction and efficiency by such direct straight line application of the power medium to the launching piston. The arrangement of control valve 68 with the power medium passages controlled thereby in the cylinder head adjacent valve 65 further simplifies the construction, conserves space and avoids the hazards of exposed piping.

While we have described and illustrated a satisfactory and practical structure and method of operation embodying our invention, we are aware that an inspection of this disclosure by persons, in the exercise of skill in the art, will doubtless readily prompt various suggestions as to modifications of the construction and arrangement of the parts and steps. We therefore wish it to be understood that such modifications are within the fair scope of this invention as disclosed herein and are intended to be embraced in the inventive concept hereof.

The invention above disclosed may be manufactured and used by or for the Government of the United States for governmental purposes without the payment to us of any royalty thereon or therefor.

What we claim is:

1. In combination in a launching catapult, a launching car, means including a cylinder and piston for propelling said launching car, said cylinder having a valve opening therein and a larger opening opposite and spaced from said first opening, said first stated opening leading through the cylinder and to the piston head and having a valve seat adapted to seat a valve on its face toward said larger opening, a valve disc having two different sized integral portions one of which is provided with a seat adapted to cooperate with said seat on said first stated opening and the other adapted to seal and slide in said larger opening, means whereby a fluid pressure may be maintained intermediate said openings and exert pressure upon said different sized portions normally tending to lift said valve from its seat on the first mentioned opening, and for at will admitting and exhausting fluid to and from the surface of said valve within said larger opening and respectively holding to and permitting the raising of said valve from its said seat on the first mentioned opening.

2. In combination in a launching catapult, a launching car, means for applying power to propel said car, means for locking the car in starting position, means for further locking the car in starting position and restraining launching force from affecting the locking means, and manually operable means for operating said further locking and restraining means; whereby the car may be further locked in starting position with its locking means substantially unaffected by the launching force until the operation of the operable means and until the launching force has subjected the locking means to a predetermined stress.

3. In combination in a launching catapult, a launching car, means for applying power to propel said car, two means for locking the car in starting position, manually operable means for locking and releasing one of said locks, and the other of said locking means comprising a replaceable member securing the car to the frame and adapted to be broken by said power when exerting a definite force on the car after the release of the locking means operated by said manually operable means, said manually operable locking means while in locking position receiving the stress of said power thereby preventing said breaking of said member of the other locking means.

4. In combination in a launching catapult, a launching car, and expansible chamber motor connected to said car, means for holding said car in starting position against any force less than the full force normally exerted by said motor when in operation, and a safety lock associated with said holding means for preventing movement of said car even upon application of the full force of said motor.

5. In combination, a launching catapult, a launching car, an expansible chamber motor connected to said car, means for holding said car in starting position against any force less than the full force normally exerted by said motor when in operation, a safety lock associated with said holding means for preventing movement of said car even upon application of the full force of said motor, and manual means for releasing said safety lock to permit propulsion of said car upon the application of power to said motor.

6. In combination in a launching catapult, a launching car, a cylinder and piston for propelling said car, a power transmitting cable adapted to be connected to said piston and car, manually operable means for placing said cable under a predetermined degree of tension, and means operable independent of said first means for taking up any permanent stretch of the cable.

7. In combination in a launching catapult, a launching car, a cylinder and piston for propelling said car, a power transmitting cable adapted to be connected to said piston and car, manually operable means for taking any initial slack out of said cable, and associated manually operable means for placing said cable under a predetermined amount of additional tension.

8. In combination in a catapult, a launching car, a motor for propelling said car, a power transmitting cable adapted to connect said motor and car, a threaded rod attached to said cable, means for taking any initial slack out of said cable comprising a handwheel threaded to said rod and a bearing for said hand-wheel permitting rotation thereof and consequent longitudinal movement of said rod, and additional means for placing said cable under a predetermined amount of additional tension.

9. In a fluid pressure operated catapult for launching airplanes, a launching car adapted to support an airplane, a piston adapted to propel said launching car, a cylinder surrounding said piston and having two openings in the head thereof, with a passageway between said openings, one of said openings being of lesser area than the other, and opening into said cylinder, a valve extending across said passageway for normally closing said openings, and movable in the bore of said opening which does not enter the cylinder a second passageway in the head of said cylinder leading from said first passageway to an area of said valve movable in said opening and to the atmosphere, and means for controlling said second passageway to connect with said first passageway or the atmosphere whereby the force of the fluid pressure in said first passageway would open said valve but for the pressure thereof in said second passageway which when released to the atmosphere quickly opens said valve to cause a great surge of pressure fluid into said cylinder to drive said piston to propel said car.

10. The combination of claim nine characterized by a spring normally holding said valve closed.

11. The combination of claim nine characterized by means for securing said car against launching movement, and safety locking means for further securing said car against launching movement.

12. The combination of claim nine characterized by said valve and the openings adapted to be closed thereby being in a plane with and close to the bore of said cylinder.

13. The combination of claim nine characterized by means for operating said control means by which fluid pressure may be caused to reclose said valve near the terminus of the launching movement of said piston.

14. The combination of claim nine characterized by said control means being a valve, and said valves and passages being in the cylinder head.

15. The combination of claim four characterized by the safety lock being provided with means for holding the holding means in position to be moved into its holding position by the movement of the safety lock into its locking position.

16. The combination of claim four characterized by said holding means comprising a breakable bar adapted to be hooked over hooks on said car and the frame, and further by said safety lock being provided with means for holding said bar on one of said hooks and in position to hook over the other hook when said safety lock is moved into its locking position.

17. In a catapult, the combination of means for supporting that which is to be catapulted, means for propelling said means for catapulting that which is to be catapulted, means extending throughout the length of travel of the supporting means for retracting said two means after the catapulting operation, and means for releasably connecting said last named means to one of said prior named means at any of a plurality of points within the length of travel of the supporting means.

18. The combination of claim seventeen characterized by said retracting means comprising a motor adapted to drive a cable extending over pulleys mounted on a stationary part of the catapult, said cable extending throughout the length of travel of the supporting means.

19. In a catapult, the combination of means for supporting that which is to be catapulted, a track therefor, means for propelling said means, buffers for decelerating said means, and means for mounting said buffers in coacting pairs upon said supporting means and said track in alignment with and adapted to impact one with the other in decelerating said supporting means.

20. In a catapult, the combination of means for supporting that which is to be catapulted, a track therefor, means for propelling said means, buffers for decelerating said means, and means for mounting said buffers in cooperative impact relation on opposite sides of the track at its launching end and on opposite sides of said supporting means.

21. In a catapult, the combination of means for supporting that which is to be catapulted, a track therefor, means for propelling said means, impacting pairs of buffer means carried by the supporting means and track, each of said pairs of buffer means comprising a piston and fluid cylinder therefor, and means for mounting said buffer means on each of said supporting means and said track.

22. In a catapult, the combination of means for supporting that which is to be catapulted, a track therefor, means for propelling said means, buffer means for decelerating one of said means, and means for latching together the contacting elements of the buffer means to prevent recoil.

23. In a catapult, the combination of means for supporting that which is to be catapulted, a track therefor, means for propelling said means, buffer means for decelerating one of said means, and means for mounting an element of said buffer means movably at a substantial angle to the direction of said track for moving the buffer means out of impact relationship.

24. The combination of claim twenty-three characterized by means for removably securing a buffer means to its movable mounting.

WILLIAM M. FELLERS.
FREDERICK B. GROSS.